Dec. 18, 1934.   J. C. KROESEN   1,985,038
IMPROVED MULTIPLE PRINTER
Filed Nov. 19, 1931
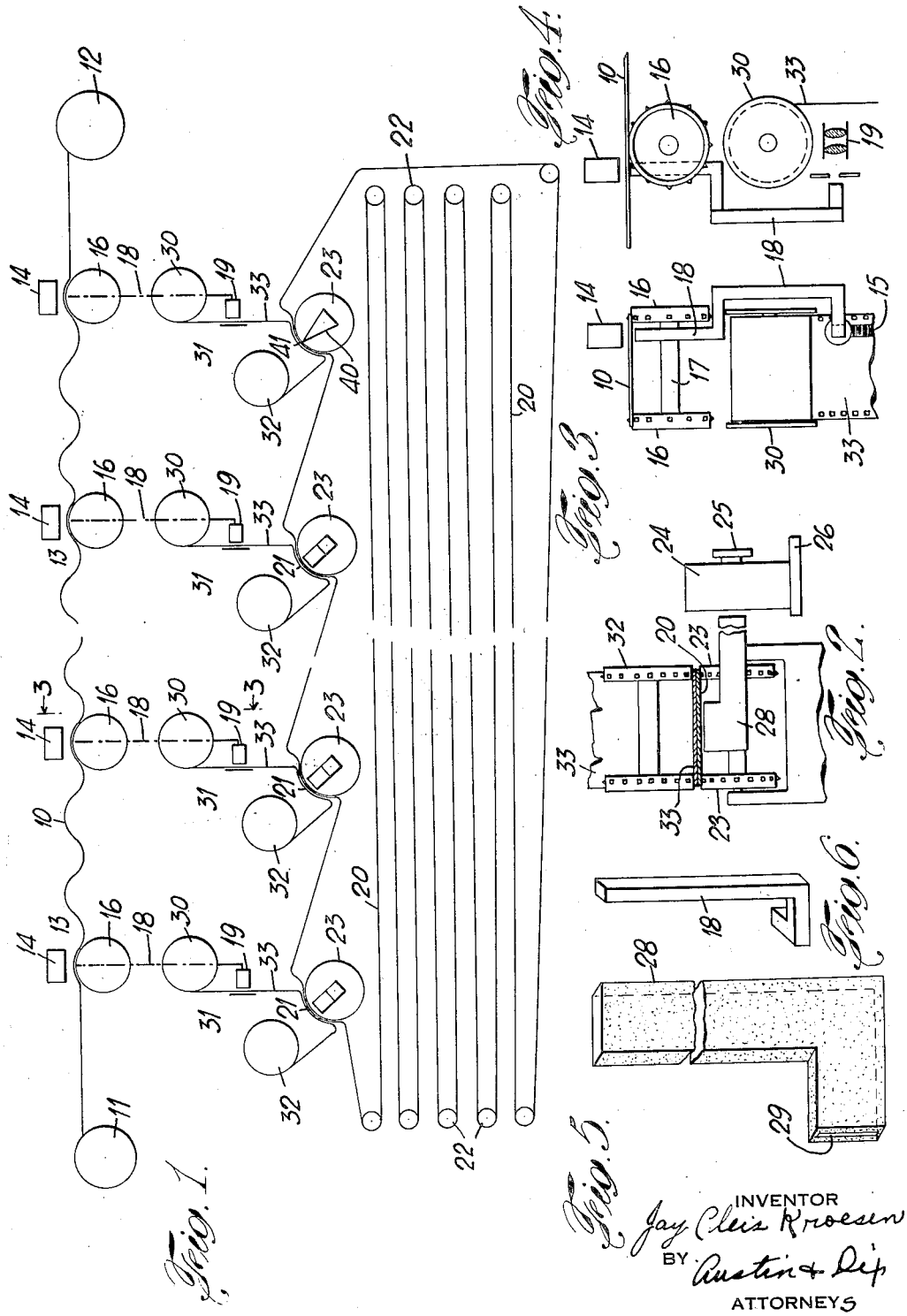

Patented Dec. 18, 1934

1,985,038

UNITED STATES PATENT OFFICE 1,985,038

IMPROVED MULTIPLE PRINTER

Jay Cleis Kroesen, Belleville, N. J.

Application November 19, 1931, Serial No. 576,021

2 Claims. (Cl. 88—24)

This invention relates to improvements in methods of printing motion picture films and to an improved multiple printing apparatus therefor.

Hitherto in the printing of moving picture films it has been necessary to use a separate positive or negative film for each negative or positive film printed. Such operation required the attention of a single operative for each such printing with a resultant increase in cost and time involved.

It is an object of the present invention to provide an improved process for printing a plurality of films from a single negative or positive and at a single operation.

Another object of this invention is the provision of an improved printing process for motion picture films in which a sound record is photographed on a film at the same time that a picture is printed.

Yet another object of this invention is the provision of an improved process for simultaneously printing a plurality of positive or negative films from a single master sound film and a single master picture film.

It is also an object of this invention to provide an improved apparatus adapted for use in printing a multiplicity of films from a unitary master film.

Still another object of this invention is the provision of such an improved apparatus in which separate sound and picture films are used with an improved optical system whereby a plurality of combined sound and picture films are simultaneously printed from said master films.

These and other desirable objects and advantages of the present invention will be described in the accompanying specification and illustrated in the drawing, a certain preferred embodiment being shown by way of illustration only, for, since the underlying principles may be incorporated in other specific mechanical constructions, it is not intended to be limited to the one here shown, except as such limitations are clearly imposed by the appended claims.

In the drawing, like numerals refer to similar parts throughout the several views, of which:

Fig. 1 is a side view of an improved multiple printing machine with the several cooperating parts being shown schematically;

Fig. 2 is a view taken on the line 2—2 of Fig. 1 showing the picture printing device and light source;

Fig. 3 is a view taken on line 3—3 of Fig. 1 showing the sound picture recording apparatus;

Fig. 4 is a view similar to Fig. 3 and taken at right angles to the latter;

Fig. 5 is a light transmitting member for use in picture printing; and

Fig. 6 is a modified form of a light transmitting member for transmitting sound photographs.

Referring more specifically to the drawing, there is disclosed a master sound film 10 and a master picture film 20. The sound film is taken off a supply reel 11 onto a take-up reel 12 and is looped through a plurality of successively disposed printing heads 13. The printing heads 13 may comprise a lamp housing 14 having a suitable source of light, and means for controlling same, together with suitable apertures which are adapted to register with sound track area 15 of the film 10. The film 10 is adapted to be rotated onto sprockets 16 mounted on shafts 17. The shafts 17 may be severally provided with means for driving the same separately, suitable loops being formed in the film 10 between the units 13, if desired.

The beam of light from the light housing 14 is passed through the sound track 15 and is collected in an optical or light transmitting member 18 comprising a tube of lime glass or quartz which is suitably configured as indicated in Figs. 3 and 4 to enable them to pass around the take-up reels 30 of the units 31. The units 31 comprise a take-up reel 30 and a supply reel 32 for the films 33 to be printed, which films are adapted to pass over and contact with film 20 at printing heads 21 and thereafter pass through the sound printing heads 19. While it is normally intended to print sound records after the picture records, it will, of course, be appreciated that the operative steps may be reversed without departing from the spirit of the invention.

The film 20 which may be a master negative or master positive picture film, may be adapted for continuous operation and is shown looped on rollers 22. It is successively passed through the several printing heads 21 on the sprocket wheels 23. The films 20 and 33 are contacted in the printing heads 21 so as to prevent any space therebetween and thus obtain optimum clarity and definition in the prints. While the film 20 has been shown as mounted for continuous operation, it will, of course, be appreciated that it may be mounted on a supply reel, and successively drawn through the several printing heads onto the take-up reel.

The printing heads 21 are provided with a separate lamp housing 24 having a rheostat or other control 25 and being slidably mounted on a base member 26. An angular quartz or limeglass member 28 is abutted against the light aperture of the lamp housing 24 and is adapted to be passed in between the sprocket wheels 23 so as to permit the aperture 29 of member 28 to abut against the master film 20. The slot or aperture 29 formed on member 28 is substantially the width of the frame of the picture or film 20 and the member 28 may be frosted over its entire surface with the exception of the ends through which the light is adapted to pass. Due to its optical characteristics, the member 28 is adapted to pass the light through a variety of angles and thus permit the lamp housing and light controls to be placed at a safe and convenient distance from the printing heads. The member 28, instead of having an aperture 29 formed at one end thereof, may have the end in the printing head formed into a wedge-shaped member 40 having an apex 41 forming a line of the desired aperture width.

Such a system will permit the individual regulation of the several printing heads and will also permit the use of a single film to simultaneously print a plurality of films from a single master film in one operation. The member 18 may have any desired configuration, as shown in Figs. 3, 4 and 6 and both the members 18 and 28 may be replaced by suitable mirrors or lens trains suitably housed.

While certain novel features of the invention have been disclosed and are pointed out in the annexed claims, it will be understood that various omissions, substitutions and changes may be made by those skilled in the art without departing from the spirit of the invention.

What is claimed is:

1. An improved apparatus for simultaneously printing sound records and picture records on a plurality of motion picture films from separate master sound films and master picture films comprising a plurality of separate printing heads for sound records and for picture records, a separate source of light for each printing head and disposed exteriorly thereof; a continuous master sound film adapted to pass successively in front of the sound printing heads and a continuous master picture film adapted to pass successively in front of a plurality of picture printing heads, a plurality of films to be printed including storage and take up reels, the sound printing members including sprocket wheels adapted to successively move the master sound film in front of the source of light; means including quartz rods disposed inside said film-advancing sprockets and to a side thereof corresponding to the location on said master film of the sound track, the said quartz member being continued downwardly and outwardly and disposed around the storage spool of the film to be printed, the terminal end of the quartz light conductor being adapted to pass in front of and adjacent to the film to be printed and in juxtaposition to the sound track thereof; the said picture printing heads being disposed in advance of the sound printing head and being provided with separate light source having a quartz light conducting member associated therewith and adapted to pass light from the separate light sources through the master picture film onto the film to be printed.

2. In a sound and picture printing apparatus for printing multiple films from a plurality of master sound and picture films, improved apparatus for printing the sound comprising a light source adapted to be juxtapositioned to the master film at the sound track thereof, a sprocket mechanism for advancing the master sound film, a quartz light conducting member disposed internally of the sprocket mechanism and at one side thereof in alinement with the sound track of the master film, a storage reel for a film to be printed disposed below the master film advancing mechanism, the quartz conducting rod being advanced around the exterior of the storage reel and provided with a terminal end adapted to be alined with the sound track of the film to be printed.

JAY CLEIS KROESEN.